United States Patent Office 3,114,266
Patented Dec. 17, 1963

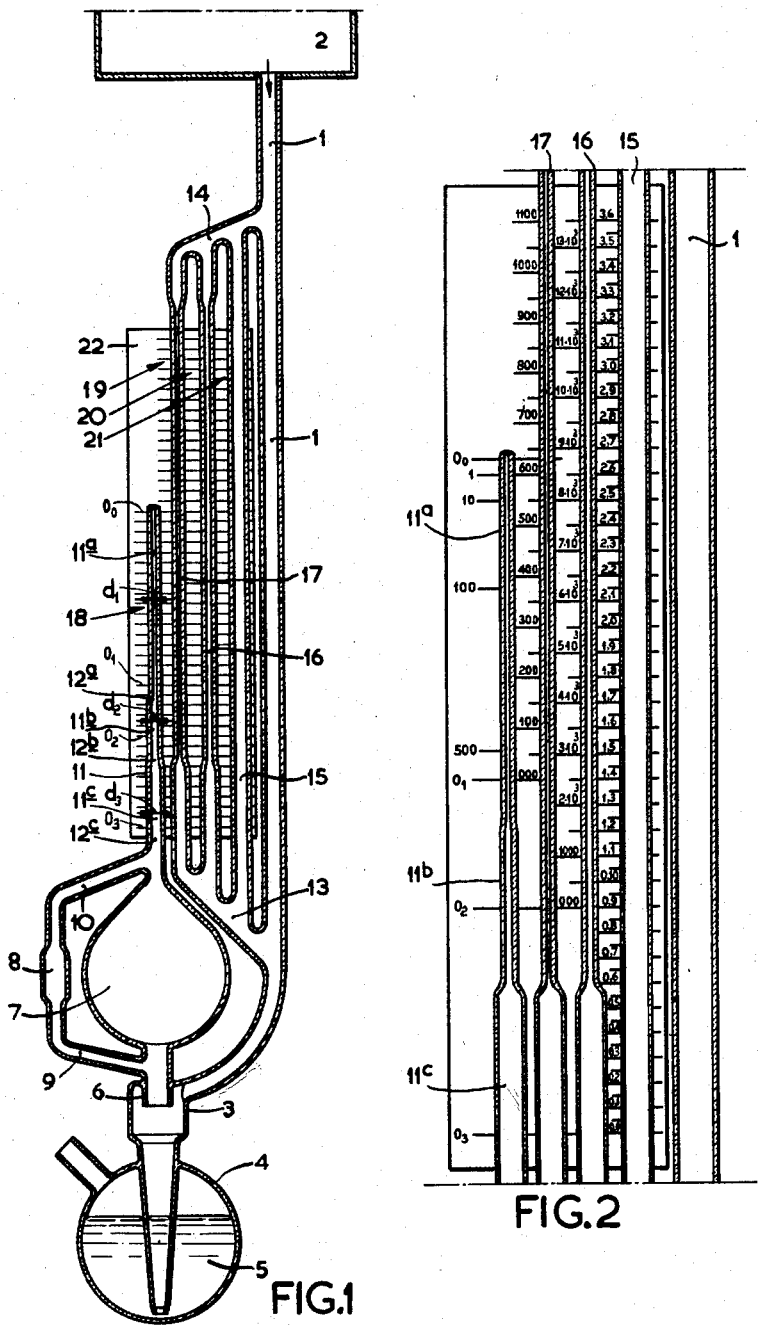

3,114,266
DEVICE FOR MEASURING LOW GAS PRESSURES
Constant Gijsbertus Johannes Jansen, Johannes Cornelis Schepers, and Albertus Venema, Eindhoven, Netherlands, assignors to North American Philips Company, Inc., New York, N.Y., a corporation of Delaware
Filed Dec. 8, 1959, Ser. No. 858,194
Claims priority, application Netherlands Dec. 9, 1958
3 Claims. (Cl. 73—400)

This invention relates to devices of the McLeod type for measuring low gas pressures, provided with a chamber for compressing a quantity of the gas, the pressure of which is to be measured, by means of a fluid, such as mercury, which chamber (compression chamber), is connected, via one or more transition chambers to a thin, rising tube or parts of that tube, which either has the same inside diameter everywhere or, viewed longitudinally, consists of a number of parts connected by transition chambers, which have the same inside diameter everywhere, the diameters of the parts, however, differing mutually and tapering towards the closed upper end of the tube, in which tube (compression capillary) gas can be compressed, which device is, in addition, provided with one or more thin tubes (comparison capillaries), which run parallel to the compression capillary and are connected or can be connected to a chamber containing gas, the pressure of which is to be measured, and to the compression chamber in which in the neighborhood of the tubes a reading scale is provided.

In the technical science, such devices are shortly called McLeods. It is one of the few instruments which render it possible to measure the actual value of a low gas pressure in the order from $10^{-5}$ to 5 mm. Hg without any change in the composition of the gas. For that reason, such an instrument is indispensible for gauging instruments measuring more sensitively and more rapidly, such as ionization manometers, which measure only in relative pressure units.

However, it is highly time-consuming to make and calibrate a McLeod, which may be used as a standard instrument.

It then appears for each individual case, that the instrument is going to have scales which are not as easy to read, because when using a scale divided for example in cms. and mms., not one cm. of the scale corresponds to a whole number of pressure units (often $10^{-n}$ mm. Hg is chosen as such unit, $n$=integer number) and when using several scales the zero lines are not spread from each other at whole multiples of cms., as a result of which each scale has to be fixed separately.

Now the invention offers a solution for the problem of making a McLeod, which, without preceding calibrating by the user, offers a satisfactory and simple absolute reading of the pressure.

According to the invention, the volumes of the compression chamber, the transition chamber or chambers and the compression capillary and the parts thereof respectively are proportioned so, that on the scale available for each pressure range, the zero level lies at a distance from the level of the closed end of the compression capillary corresponding to whole and half numbers of cms. respectively or other measuring units, while a gas pressure of $10^n$ mm. Hg ($n$=whole number) corresponds to a fluid level difference of whole multiples of cms. or other measuring units.

The invention is based on the recognition that a McLeod having conveniently arranged scales to be manufactured beforehand, which render immediate and satisfactory absolute reading possible, can be obtained if special attention is paid to the above volumes and if these are proportioned carefully.

In order to be able to give the compression chamber the right value it is desirable to provide this chamber with a relatively small correction volume which is connected to the upper and lower side of the compression chamber by means of inclined tubes.

Calculations proved that an exact proportioning of said volumes indeed afforded the said possibility.

In order that the invention may be readily carried into effect, it will now be described with reference to a concrete numerical example.

FIG. 1 of the drawing shows diagrammatically a McLeod in front-view and

FIG. 2 shows a part of FIG. 1 on an exaggerated scale.

The tube 1 is connected to a gas-filled chamber 2, the pressure in which chamber is to be measured.

The whole should be considered in an upright position.

At its lower end tube 1 is connected to a tube 3 the lower end of which empties into a container 4, containing a quantity of manometer fluid 5.

Pure mercury has turned out to be the most suitable manometer fluid.

Tube 3 is connected to a compression chamber 7, shortly called compression sphere, by means of a spout 6. A correction chamber 8 is connected to the upper and lower sides of the sphere 7 by means of inclined tubes 9 and 10.

In the light of the invention, the volume of this sphere should have a very specific volume. It is difficult for the glass blower to bring the inside dimensions of this sphere 7 within the tolerances. Therefore, the sphere 7 is underdimensioned and a correction volume 8 is used to obtain the exact volume. The inclined tubes 9 and 10 prevent gas inclusions in the mercury.

The sphere 7 is at its upper end connected to a capillary 11 which is made up of three parts 11a, 11b, 11c having different inside diameters $d_1$, $d_2$, $d_3$ which merge into each other via transition volumes 12a, 12b. Between part 11c and the compression sphere 7 there is a transition volume 12c.

Zero lines are indicated by $O_0$, $O_1$, $O_2$ and $O_3$.

Vertical tubes 15, 16 and 17, called comparison capillaries, communicate with the tube 1 via the inclined tubes 13 and 14.

The inside diameter of tube 15 equals $d_3$, which equals the inside diameter of part 11c of tube 11. The inside diameter of tube 16 equal $d_2$, which is the inside diameter of part 11b of tube 11 and the inside diameter of tube 17 equals $d_1$, which is the inside diameter of part 11a of capillary 11.

These equalities are desired to prevent differences in capillary depression which cause a mistake in the height between the levels in the tubes.

Beside the tubes 11, 17, 16, 15 scales are provided, namely a quadratic scale 18 associated with part 11a of tube 11 and linear scales 19, 20 and 21 associated with the tubes 17, 16 and 15 respectively. All the scales are applied to a plate 22, which may be made as an integral assembly with the scales, subject to the volumes of the sphere 7, all the capillaries and the transition volumes being proportioned accurately.

The right-hand scale 21 indicates 0.1 mm. Hg per cm.

The scale 20 extends from 0 to 0.135 mm. Hg, every two cms. indicating $10^{-2}$ mm. Hg.

The scale 19 extends from 0 to $1.1 \cdot 10^{-2}$ mm. Hg, every two cms. indicating $10^{-3}$ mm. Hg, and the quadratic scale extends from 0 to $5 \cdot 10^{-3}$ mm. Hg.

It is evident that these scales are particularly easy to read. This is possible when the following principal sizes of the instrument are chosen:

$d_1$=0.0500 cm., $d_2$=0.2945 cm. and $d_3$=0.995 cm.;

Volume of the compression sphere 7 plus the correction chamber 8 and the transition volume $12c = 484.0$ cm.$^3$;

Volume of the part of the compression capillary having the smallest diameter $d_1 = 0.0275$ cm.$^3$;

Volume of the transition chamber of the last-mentioned part of the compression capillary towards the part having the inside diameter $d_2 = 0.0135$ cm.$^3$;

Volume of the part of the compression capillary having the inside diameter $d_2 = 0.4085$ cm.$^3$;

Volume of the transition chamber of the last-mentioned part of the compression capillary towards the part having the inside diameter $d_3 = 0.1795$ cm.$^3$;

Volume of the part of the compression capillary having the inside diameter $d_3 = 6.220$ cm.$^3$.

The operation of a McLeod may be considered known.

What is claimed is:

1. A device of the McLeod type for measuring low gas pressures comprising a compression chamber having a given volume for compressing a quantity of gas the pressure of which is to be measured, a fluid chamber containing a fluid and to which said compression chamber is connected, a compression capillary tube closed at one end and having a portion of uniform given diameter in which the gas can be compressed, a transition chamber connecting said capillary tube to said compression chamber, at least one comparison capillary tube located parallel to the compression capillary tube and connected to a chamber containing the gas and to the compression chamber, scale means having a plurality of pressure ranges located adjacent to the comparison and compression capillary tubes, said compression chamber, said transition chamber, and said compression capillary having volumes proportioned so that the zero level on said scale means for each pressure range is located at a distance from the level of the closed end of the compression capillary tube corresponding to whole and half units of length and a pressure of $10^n$ mm. Hg where $n$ is an integer corresponds to a fluid level difference of whole multiples of said units of length, a volume correction chamber for providing an accurate calibration of the device, said volume correction chamber having a volume which is relatively small compared with that of the compression chamber, and inclined tubes connecting said volume correction chamber in parallel with said compression chamber through the connections with the compression capillary tube and the fluid chamber.

2. A device as claimed in claim 1 in which the compression capillary tube has a plurality of portions of uniform and different diameters connected together by transition chambers.

3. A device as claimed in claim 2 in which a separate scale is associated with each of a plurality of comparison capillary tubes.

References Cited in the file of this patent

UNITED STATES PATENTS

| | | |
|---|---|---|
| 2,286,384 | Sanderson | June 16, 1942 |
| 2,363,027 | Vayda et al. | Nov. 21, 1944 |
| 2,584,945 | Todd | Feb. 5, 1952 |
| 2,780,102 | Flowsdorf | Feb. 5, 1957 |
| 3,023,622 | Hezarifend | Mar. 6, 1962 |
| 3,034,866 | Sundberg | May 15, 1962 |

OTHER REFERENCES

Publication: "Scientific Glass Blowing and Laboratory Techniques," by W. E. Barr and V. J. Anhorn, Instruments, vol. 19, Oct. 1, 1946, pages 666–680.